US012420295B2

(12) United States Patent
Nonoyama et al.

(10) Patent No.: US 12,420,295 B2
(45) Date of Patent: Sep. 23, 2025

(54) LIQUID DROPLET DISCHARGING APPARATUS

(71) Applicants: Yusuke Nonoyama, Kanagawa (JP); Takahiko Matsumoto, Kanagawa (JP); Toshihiko Hosoya, Tokyo (JP)

(72) Inventors: Yusuke Nonoyama, Kanagawa (JP); Takahiko Matsumoto, Kanagawa (JP); Toshihiko Hosoya, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 552 days.

(21) Appl. No.: 17/692,201

(22) Filed: Mar. 11, 2022

(65) Prior Publication Data

US 2022/0288609 A1 Sep. 15, 2022

(30) Foreign Application Priority Data

Mar. 12, 2021 (JP) ................................ 2021-039853

(51) Int. Cl.

| | |
|---|---|
| ***B05B 1/34*** | (2006.01) |
| ***B41J 2/01*** | (2006.01) |
| ***B41J 2/14*** | (2006.01) |
| ***B41J 2/16*** | (2006.01) |

(52) U.S. Cl.

CPC .............. *B05B 1/3402* (2018.08); *B41J 2/01* (2013.01); *B41J 2/14201* (2013.01); *B41J 2/1433* (2013.01); *B41J 2/1606* (2013.01); *B41J 2202/15* (2013.01)

(58) Field of Classification Search

CPC ... B05B 1/3402; B41J 2202/15; B41J 2/1606; B41J 2/1433; B41J 2/01; B41J 2/14201

See application file for complete search history.

(56) References Cited

U.S. PATENT DOCUMENTS

| | | | | |
|---|---|---|---|---|
| 6,102,521 | A | 8/2000 | Halko et al. | |
| 6,290,331 | B1 | 9/2001 | Agarwal et al. | |
| 2002/0001016 | A1 | 1/2002 | Aono et al. | |
| 2007/0040870 | A1* | 2/2007 | Lu .......................... | B41J 2/1606 347/68 |
| 2008/0129780 | A1 | 6/2008 | Cha et al. | |
| 2009/0237453 | A1 | 9/2009 | Van Den Berg et al. | |
| 2019/0263124 | A1* | 8/2019 | Takahashi .............. | B41J 2/1634 |

FOREIGN PATENT DOCUMENTS

| | | | |
|---|---|---|---|
| EP | 2 072 261 | A2 | 6/2009 |
| JP | 2002-219805 | | 8/2002 |
| JP | 2003-320673 | | 11/2003 |
| JP | 2004-009677 | A | 1/2004 |
| JP | 2006-181827 | A | 7/2006 |
| JP | 2007-245549 | A | 9/2007 |

(Continued)

OTHER PUBLICATIONS

Extended European Search Report issued Jul. 27, 2022 in European Patent Application No. 22161666.7, 8 pages.

(Continued)

*Primary Examiner* — Frederick C Nicolas
(74) *Attorney, Agent, or Firm* — XSENSUS LLP

(57) ABSTRACT

Provided is a liquid droplet discharging apparatus that can maintain stable discharging even when a liquid containing particles or cells adheres to a nozzle surface.

4 Claims, 7 Drawing Sheets

(56) References Cited

FOREIGN PATENT DOCUMENTS

| | | | |
|---|---|---|---|
| JP | 2009066876 | A | 4/2009 |
| JP | 2009-178948 | | 8/2009 |
| JP | 5332275 | | 11/2013 |
| JP | 2021-137792 | | 9/2021 |
| WO | WO2021/182143 | A1 | 9/2021 |

OTHER PUBLICATIONS

Office Action issued Oct. 22, 2024 in Japanese Patent Application No. 2021-039853, 6 pages.

Decision of Dismissal of Amendment mailed Jul. 15, 2025, in Japanese Application No. 2021-039853, 6 pages including English translation.

* cited by examiner

LIQUID DROPLET DISCHARGING APPARATUS

CROSS-REFERENCE TO RELATED APPLICATIONS

The present application claims priority under 35 U.S.C. § 119 to Japanese Patent Application No. 2021-039853 filed Mar. 12, 2021. The contents of which are incorporated herein by reference in their entirety.

BACKGROUND OF THE INVENTION

Field of the Invention

The present disclosure relates to a liquid droplet discharging apparatus.

Description of the Related Art

Recent inkjet techniques not only form images of letters and pictures using usual inks, but are widely attempting to form patterns having special functions using inks containing particles or cells.

In the inkjet techniques, nozzle shapes for stabilizing discharging liquid droplets have been known because there is a need for discharging liquid droplets to accurate positions stably.

However, there has been a problem that existing nozzle shapes cannot maintain stable discharging when inks containing particles or cells adhere to the nozzle surface.

A reported inkjet recording head intended to stabilize discharging after a wiping operation includes a plurality of ink discharging holes through which an ink is discharged, orifices leading to the ink discharging holes, an orifice plate in which these orifices are formed, a liquid flow path, and a discharging pressure generating element used for discharging an ink and provided at a predetermined position of the liquid flow path, wherein the orifice plate includes grooves having upper ends at the same height as the discharging surface and having a depth smaller than or equal to the plate thickness of the orifice plate, wherein the grooves have a shape surrounding the discharging holes and are provided at positions apart from the discharging holes (for example, see Japanese Unexamined Patent Application Publication No. 2003-320673).

SUMMARY OF THE INVENTION

According to one aspect of the present disclosure, a liquid droplet discharging apparatus includes a liquid droplet discharging unit. The liquid droplet discharging unit includes a nozzle surface, and a nozzle is formed in the nozzle surface. The liquid droplet discharging unit is configured to discharge a liquid through the nozzle. A water contact angle of an adjoining region of the nozzle in the nozzle surface is greater than a water contact angle of any other region of the nozzle surface.

Figure 1:
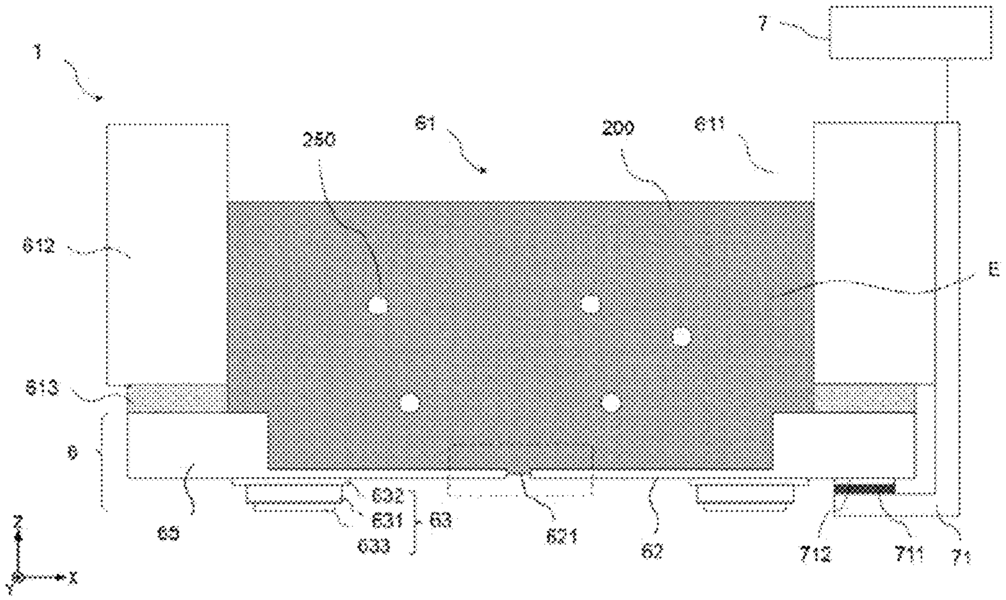
FIG. 1 is a schematic view illustrating an example of a liquid droplet discharging head of a liquid droplet discharging apparatus of the present disclosure.

DESCRIPTION OF THE EMBODIMENTS (Liquid Droplet Discharging Apparatus)

A liquid droplet discharging apparatus of the present disclosure includes a liquid droplet discharging unit. The liquid droplet discharging unit includes a nozzle surface, and a nozzle is formed in the nozzle surface. The liquid droplet discharging unit is configured to discharge a liquid through the nozzle. A water contact angle of an adjoining region of the nozzle in the nozzle surface is greater than a water contact angle of any other region of the nozzle surface.

The present disclosure has an object to provide a liquid droplet discharging apparatus that can maintain stable discharging even when a liquid containing particles or cells adheres to a nozzle surface.

The present disclosure can provide a liquid droplet discharging apparatus that can maintain stable discharging even when a liquid containing particles or cells adhere to a nozzle surface.

The liquid droplet discharging apparatus of the present disclosure includes at least a liquid droplet discharging unit, and further includes other units as needed.

The liquid droplet discharging apparatus of the present disclosure includes a liquid droplet discharging unit. The liquid droplet discharging unit includes a nozzle surface, and a nozzle is formed in the nozzle surface. The liquid droplet discharging unit is configured to discharge a liquid through the nozzle. A water contact angle of an adjoining region of the nozzle in the nozzle surface is greater than a water contact angle of any other region of the nozzle surface.

The liquid droplet discharging apparatus of the present disclosure is based on the following problems found in the existing techniques. That is, in the existing inkjet recording head disclosed in Japanese Unexamined Patent Application Publication No. 2003-320673, the grooves formed around the discharging holes have a function of accommodating an ink, but there is a problem that the ink accommodated in the grooves and the ink in the discharging hole cannot be securely separated from each other. Accordingly, the existing inkjet recording head can stabilize discharging an ink by eliminating influences of any ink adhering to the nozzle surface, but when a liquid containing particles or cells is used, cannot maintain stable discharging if such a liquid overflows to the nozzle surface.

The liquid droplet discharging apparatus of the present disclosure can maintain stable discharging even when a liquid containing particles or cells adheres to the nozzle surface. Therefore, for example, when discharging liquid droplets of a liquid such as a cell suspension into a well plate (container) including a plurality of wells used for an assay, the liquid droplet discharging apparatus can discharge a liquid droplet of a constant amount to the accurate position of each well without being given adverse influences by any liquid adhering to the nozzle surface (e.g., disorder of the discharging direction, and changes of the amount of the liquid to be discharged). Accordingly, the liquid droplet discharging apparatus can stably maintain the accuracy of the discharging position of a liquid droplet and the amount of the liquid to be discharged.

<Liquid Droplet Discharging Unit>

The liquid droplet discharging unit is a liquid droplet discharging unit configured to discharge a liquid through a nozzle formed in a nozzle surface. Preferable examples of the liquid droplet discharging unit include a liquid droplet discharging head.

The liquid droplet discharging unit preferably includes a nozzle plate including a nozzle surface and nozzles formed in the nozzle surface, and further includes other members as needed.

<<Nozzle Plate>>

The nozzle plate includes the nozzle surface as a surface at a side to which a liquid droplet of the liquid is discharged, and includes nozzles (hereinafter may also be referred to as "nozzle holes"), which are through-holes formed in the nozzle surface.

The nozzle plate is not particularly limited and a known nozzle plate may be appropriately selected depending on the intended purpose. A nozzle plate formed of silicon (Si) as a main component is preferable.

The content of silicon in the nozzle plate is preferably 50% by mass or greater, more preferably 60% by mass or greater, and yet more preferably 70% by mass or greater.

It is preferable that the nozzle surface have a water repellent film.

[Water Contact Angle]

The water contact angle of an adjoining region of the nozzle in the nozzle surface is greater than the water contact angle of any other region of the nozzle surface. When a region having a relatively high water contact angle is provided around the nozzle in the nozzle surface, it is possible to maintain stable discharging even when a liquid containing particles or cells adheres to the nozzle surface.

The "water contact angle" is a contact angle of pure water measured by the θ/2 method.

The water contact angle $\theta_1$ of the adjoining region is not particularly limited and may be appropriately selected depending on the intended purpose so long as the water contact angle $\theta_1$ is relatively greater than the water contact angle $\theta_2$ of the any other region, and is preferably 140 degrees or greater, more preferably 150 degrees or greater, and yet more preferably 160 degrees or greater. The difference ($\theta_1-\theta_2$) between the water contact angle $\theta_1$ of the adjoining region and the water contact angle $\theta_2$ of the any other region is preferably 25 degrees or more, more preferably 35 degrees or more, and yet more preferably 45 degrees or more.

[Adjoining Region]

The adjoining region is a region present in a manner to surround the nozzle, and has a water contact angle relatively greater than the water contact angle of any other region of the nozzle surface.

The adjoining region of the nozzle in the nozzle surface is not particularly limited so long as the adjoining region is a region present in a manner to surround the nozzle, and may be a region present in a manner to contact the edge of the nozzle (nozzle hole) or a region present slightly apart from the edge of the nozzle (nozzle hole).

It is preferable that the distance between the edge of the nozzle and the adjoining region be constant all around the nozzle. The distance is preferably 20 micrometers or less, more preferably 10 micrometers or less, and yet more preferably 0 micrometers.

It is preferable that the adjoining region have a circular shape concentric with the nozzle.

Figure 2:
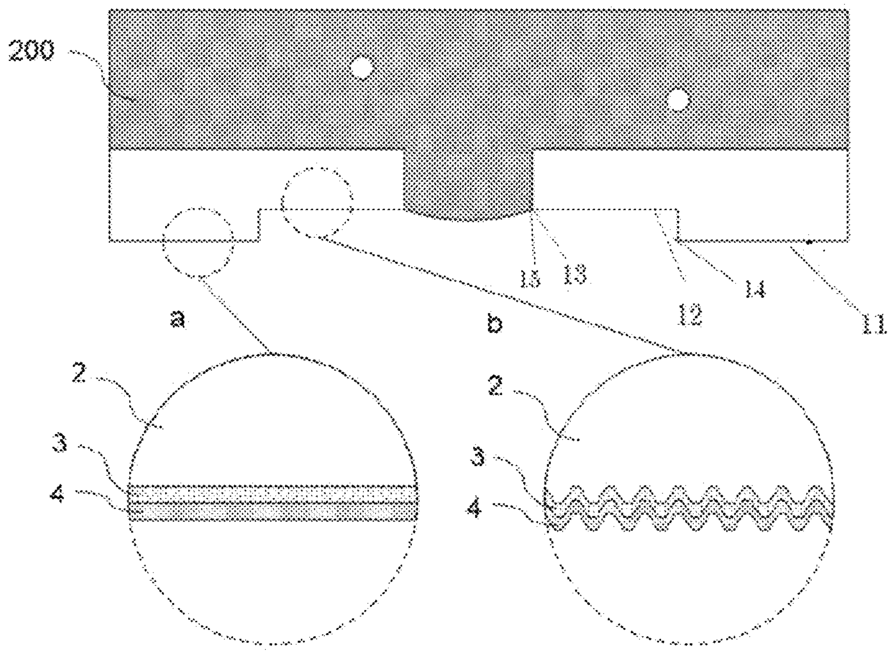
FIG. 2 is a schematic view illustrating an example of a structure around a nozzle of a liquid droplet discharging apparatus.

As shown in FIG. 2, the size of the adjoining region 12, expressed by the distance between the inner rim 13 and the outer rim 14 of the adjoining region, is preferably greater than or equal to half the diameter of the nozzle hole but less than or equal to five times greater than the diameter of the nozzle hole.

When the distance between the edge of the nozzle 15 and the adjoining region 12 is extremely long or when the size of the adjoining region is extremely small, there is a risk that stable discharging may not be achieved because any liquid overflowing to the nozzle surface 11 cannot keep a distance enough not to influence the next discharging. When the size of the adjoining region is extremely large, there is a risk that any liquid overflowing to the nozzle surface may remain in the adjoining region, and the remaining liquid may influence discharging of the next liquid droplet.

The water contact angle is not particularly limited, may be appropriately adjusted by a known method depending on the intended purpose, may be adjusted by providing a water repellent film on the adjoining region, or may be adjusted by adjustment of the surface roughness of the adjoining region as described below.

The distribution of the water contact angle values may be uniform or may be varied in the adjoining region. When the distribution of the water contact angle values is varied, it is preferable that the water contact angle of the inner region within the adjoining region of the nozzle when seen in the radial direction about the nozzle be greater than the water contact angle of the outer region within the adjoining region.

It is preferable to provide the variation in a manner that the water contact angle at a side closer to the nozzle (inner side) is relatively greater, and the variation may be a monotonous variation, a variation in a logarithmic function manner, or a gradual variation.

[Surface Roughness]

It is preferable that the surface roughness of the adjoining region of the nozzle in the nozzle surface be greater than the surface roughness of the any other region of the nozzle surface. In this way, the water contact angle of the adjoining region may be greater than the water contact angle of the any other region due to the surface roughness of the adjoining region being greater (coarser) than the surface roughness of the any other region.

The surface roughness Ra can be measured according to JIS B0601:2013, and can be measured with, for example, a confocal laser microscope (available from Keyence Corporation) or a stylus surface profilometer (DEKTAK 150, available from Bruker AXS GmbH).

The surface roughness $Ra_1$ of the adjoining region is not particularly limited and may be appropriately selected depending on the intended purpose so long as the surface roughness $Ra_1$ is relatively greater than the surface roughness $Ra_2$ of the any other region, and is preferably from 0.1 through 1.0, more preferably from 0.1 through 0.5, and yet more preferably from 0.1 through 0.3. The difference ($Ra_1-Ra_2$) between the surface roughness $Ra_1$ of the adjoining region and the surface roughens $Ra_2$ of the any other region is preferably from 0.05 through 1.00, more preferably from 0.05 through 0.50, and yet more preferably from 0.05 through 0.30.

[Concave]

It is preferable that the nozzle surface include a concave around the nozzle.

It is preferable that the adjoining region of the nozzle be present in the concave.

The concave in the nozzle surface is not particularly limited so long as the concave is a region present in a manner to surround the nozzle, and may be a region present in a manner to contact the edge of the nozzle (nozzle hole) or may be a region present slightly apart from the edge of the nozzle (nozzle hole).

It is preferable that the distance between the edge of the nozzle and the concave be constant all around the nozzle. The distance is preferably 20 micrometers or less, more preferably 10 micrometers or less, and yet more preferably 0 micrometers.

The depth of the concave from the nozzle surface (reference surface) is preferably 10 micrometers or less and more preferably 5 micrometers or less.

It is preferable that the concave have a circular shape concentric with the nozzle.

The size of the concave, expressed by the distance between the inner rim and the outer rim of the concave, is preferably greater than or equal to half the diameter of the nozzle hole but less than or equal to five times greater than the diameter of the nozzle hole.

When the distance between the edge of the nozzle and the concave is extremely long or when the depth is extremely small or when the size of the concave is extremely small, there is a risk that stable discharging may not be achieved because any liquid overflowing to the nozzle surface cannot keep a distance enough not to influence the next discharging. When the depth is extremely large or when the size of the concave is extremely large, there is a risk that any liquid overflowing to the nozzle surface may remain in the concave, and the remaining liquid may influence discharging of the next liquid droplet.

<Liquid>

The liquid is not particularly limited and may be appropriately selected depending on the intended purpose, and preferably contains settleable particles. The liquid is not particularly limited and may be appropriately selected depending on the intended purpose. Examples of the liquid include an ink composition and a cell suspension.

The settleable particles are not particularly limited and may be appropriately selected depending on the intended purpose. Examples of the settleable particles include metal particles, inorganic particles, and cells.

The cells are not particularly limited and may be appropriately selected depending on the intended purpose. Examples of the cells include cells derived from humans and cells derived from animals.

An embodiment for carrying out the present disclosure will be described below with reference to the drawings. In each drawing, the same components are denoted by the same reference numerals, and any redundant description will be skipped.

In FIG. 1, the X axis, the Y axis, and the Z axis may represent directions. The X direction along the X axis represents a predetermined direction in a recording medium, or a predetermined direction in an array plane in which a plurality of wells (concaves) of a well plate (container) (used for, for example, an assay using cells) are arrayed. The Y direction along the Y axis represents a direction orthogonal to the X direction in the recording medium or the array plane. The Z direction along the Z axis represents a direction orthogonal to the array plane.

The orientation pointed to by the arrow representing the X direction is expressed as +X direction, and the orientation opposite to the +X direction is expressed as −X direction. The orientation pointed to by the arrow representing the Y direction is expressed as +Y direction, and the orientation opposite to the +Y direction is expressed as −Y direction. The orientation pointed to by the arrow representing the Z direction is expressed as +Z direction, and the orientation opposite to the +Z direction is expressed as −Z direction. In an embodiment, it is assumed that the liquid droplet discharging head is configured to discharge a liquid droplet in the −Z direction as an example.

FIG. 1 is a schematic view illustrating an example of a liquid droplet discharging head of the liquid droplet discharging apparatus of the present disclosure.

As illustrated in FIG. 1, the liquid droplet discharging head 1 includes a chamber 61 and a wiring 71.

The chamber 61 is an example of a liquid chamber configured to store a liquid 200, and includes an atmospherically exposing portion 611, a liquid chamber member 612, an elastic member 613, and a MEMS chip 6. FIG. 1 illustrates an example case where the chamber 61 stores a liquid 200, which is a particle suspension in which settleable particles 250 are suspended (or settleable particles 250 are dispersed). As the settleable particles 250, for example, metal particles, inorganic particles, cells, or cells derived from humans can be assumed.

The size of the chamber 61 and the liquid amount of the liquid 200 that can be stored in the chamber 61 are not particularly limited and may be appropriately selected depending on the intended purpose. The liquid amount of the liquid 200 may be, for example, from 1 microliter through 1 mL. When the liquid 200 is, for example, a cell suspension in which cells are dispersed, the liquid amount of the liquid 200 may be from 1 microliter through 50 microliters. The liquid amount of the liquid 200 changes under control of a control unit serving as a factor contributing to the vibration characteristic of a membrane 62. The liquid amount E illustrated in FIG. 1 represents the liquid amount of the liquid 200 filled in the chamber 61.

The atmospherically exposing portion 611 is a portion that exposes the chamber 61 to the atmosphere. The chamber 61 includes the atmospherically exposing portion 611 at a side closer to the Z+ direction of the chamber 61. Bubbles mixed in the liquid 200 can be emitted from the atmospherically exposing portion 611.

The MEMS chip 6 is a device produced by microfabricating a silicon substrate through a semiconductor process using photolithography, and is an example of a vibration unit in which the membrane 62, a piezoelectric element 63, and a membrane support 65 are integrated.

The MEMS chip 6 is joined to an end of the liquid chamber member 612 extending along the direction in which a liquid droplet D is discharged (−Z direction in FIG. 1). The chamber 61 stores the liquid 200 in a space formed by joining the liquid chamber member 612 and the MEMB chip 6 to each other via the elastic member 613.

The substrate of the MEMS chip 6 is not limited to silicon, but other members formed of, for example, glass may be used. The method for producing the piezoelectric element 63 is not limited to a semiconductor process, but any other method than a semiconductor process may be used, such as a process of patterning a precursor liquid of a piezoelectric material by an inkjet method.

The membrane 62 is an example of a nozzle plate (a film-shaped member) secured to an end of the chamber 61 at a side closer to the −Z direction and formed integrally with the membrane support 65 of the MEMS chip 6. The membrane 62 includes a nozzle hole 621, which is a through hole, at approximately the center of the membrane 62. The membrane support 65 is an example of a supporting member configured to support the membrane 62.

It is preferable that the nozzle hole 621 be formed as a true-circular through hole at approximately the center of the membrane 62. However, the nozzle hole 621 may have a polygonal planar shape. When the nozzle hole 621 has a circular shape, the diameter of the nozzle hole 621 is not particularly limited, but is preferably twice or more greater than the size of the settleable particle 250 in order to avoid the nozzle hole 621 being clogged with the settleable particle 250 and discharge a liquid droplet D stably. Specifically, because the size of an animal cell, or a human cell in particular is typically about from 5 micrometers through 50 micrometers, the diameter of the nozzle hole 621 is preferably from 10 micrometers through 100 micrometers or greater to match the cell used.

On the other hand, when the liquid droplet D has an extremely large size, it is difficult to achieve the object of forming a minute liquid droplet D. Therefore, the diameter of the nozzle hole 621 is preferably 200 micrometers or less. Accordingly, in the liquid droplet discharging head 1, the diameter of the nozzle hole 621 is preferably from 10 micrometers through 200 micrometers.

The piezoelectric element 63 is an example of a vibration unit configured to vibrate the membrane 62, and formed on the lower surface of the membrane 62 integrally with the MEMS chip. The shape of the piezoelectric element 63 can be designed to match the shape of the membrane 62. For example, when the planar shape of the membrane 62 is a circular shape, it is preferable to form a piezoelectric element 63 having an annular (ring-like) planar shape around the nozzle hole 621.

The piezoelectric element 63 includes a piezoelectric material 631, a lower electrode 632 provided on the upper surface (the surface at a side closer to the +Z direction) of the piezoelectric material 631, and an upper electrode 633 provided on the lower surface (the surface at a side closer to the −Z direction) of the piezoelectric material 631.

By application of a drive waveform to the lower electrode 632 or the upper electrode 633 of the piezoelectric element 63, the membrane 62 shrinks in the X direction and a shrinking stress is applied to enable the membrane 62 to vibrate along the Z direction. As the constituent material of the piezoelectric material, for example, lead zirconate titanate can be used. Other than this, various materials can be used, such as bismuth iron oxide, metal niobate, and barium titanate, and these materials additionally including metals or different oxides.

One end of the wiring 71 is coupled to a wiring coupling portion 712 of the MEMS chip 6 via a conductive adhesive 711. The wiring 71 is led out to the external side surface of the liquid chamber member 612 and disposed along the external side surface, and the other end of the wiring 71 is coupled to a drive waveform generation source 7.

The piezoelectric element 63 vibrates the membrane 62 in response to voltages applied respectively to the lower electrode 632 and the upper electrode 633 through the wiring 711 coupled to the piezoelectric element 63 via the conductive adhesive 711. The conductive adhesive 711 is an adhesive having conductivity and formed of, for example, an epoxy resin-based material mixed with a conductive filler.

The elastic member 613 is a member formed by containing an elastic body that does not conduct the vibration generated by driving by the MEMS chip 6 to the liquid chamber member 612 as much as possible. The elastic member 613 also has a function of joining the liquid chamber member 612 and the MEMS chip 6 to each other. For example, such an elastic member 613 can be formed of an adhesive that bonds the MEMS chip 6 and the liquid chamber member 612 with each other. However, it is not indispensable to provide the elastic member 613 because the main function of the discharging head 1 can be realized even when the elastic member 613 is a hard material or when the liquid chamber member 612 and the MEMS chip 6 are directly joined to each other without the elastic member 613.

A preferable material of the liquid chamber member 612 has a weak cytotoxicity, heat resistance, and a good fabrication property. Examples of such a material include polyether ether ketone (PEEK) and polycarbonate (PC), which are so-called engineering plastics. However, materials such as other plastics, metals, and ceramics can also be used. If the liquid chamber member 612 has heat resistance, it is easy to handle the liquid chamber member 612 because the liquid chamber member 612 having heat resistance can endure treatment in an autoclave (a high pressure, 120 degrees C.) for sterilization. However, heat resistance is not an indispensable property because there are other available methods such as ethanol and UV irradiation.

The drive waveform generation source 7 is a signal generator configured to output a drive waveform as a drive signal to the piezoelectric element 63. By outputting a drive waveform to the piezoelectric element 63, the drive waveform generation source 7 can cause the membrane 62 to deform and discharge the liquid 200 stored in the chamber 61 in the form of a liquid droplet D. Moreover, by causing the membrane 62 to deform by a drive waveform set to a predetermined cycle, the drive waveform generation source 7 can cause the membrane 62 to resonantly vibrate and discharge the liquid.

It is preferable to install the MEMS chip 6 on a downstream side (a side closer to the −Z direction) of the liquid chamber member 612 in the discharging direction. In a process for locating a tissue, there may be a case where it is good to not simply locate a cell suspension but add a liquid or a gel constituting an organism or a liquid or a gel having biocompatibility before or after location of cells. This contributes to factors such as adhesiveness of a cell with the bottom of a well, the cell survival rate, and cell maturity.

FIG. 2 is a view illustrating an example of a structure around a nozzle of the liquid droplet discharging apparatus of FIG. 1. In FIG. 2, "a" and "b" exemplarily illustrate the portions enclosed within broken lines in an expanded size. "a" is an expanded view of the nozzle surface (not a concave) and "b" is an expanded view of the bottom surface of a concave in the nozzle surface.

In an embodiment of FIG. 2, a concave is formed around a nozzle hole in the nozzle surface. This concave can be formed by dry etching using a photo mask during a process of fabricating the MEMS chip. The nozzle surface that is not a concave has a surface roughness reflecting the mirror surface of a Si wafer (Ra<0.05). A fabricated surface including the bottom surface of the concave fabricated by dry etching has a relatively rough surface (Ra of from 0.1 through 1). However, the surface roughness values are reference values, and may be values in any other ranges so long as there is a difference in water contact angle.

In an embodiment of FIG. 2, a same water repellent film is formed all over the nozzle surface. However, because of the effect of the asperity in the fabricated surface of the concave (i.e., because of the relatively greater surface roughness), the water contact angle of the fabricated surface of the concave is greater than the water contact angle of the nozzle surface other than the concave. Hence, the concave corresponds to the adjoining region. $SiO_2$ (denoted by the reference numeral 3) for improving adhesiveness of a fluorine-based water repellent film is disposed between Si (denoted by the reference numeral 2), which is the main component of the nozzle plate, and the water repellent film 4.

Figure 3A:
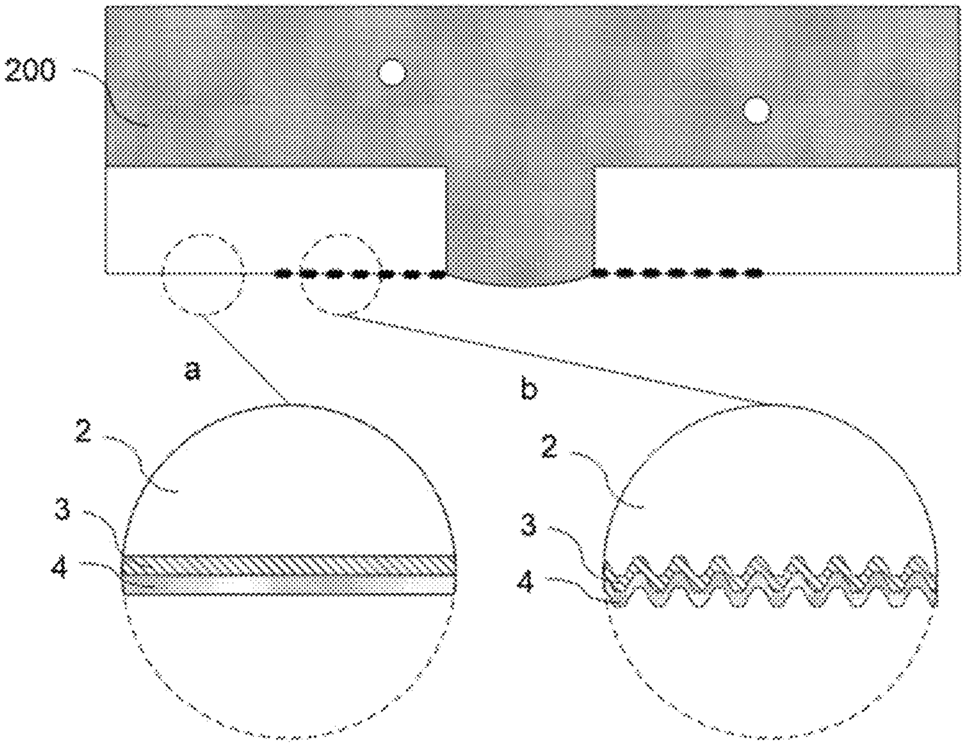
FIG. 3A is a schematic view illustrating another example of a structure around a nozzle of a liquid droplet discharging apparatus (part 1)
Figure 3B:
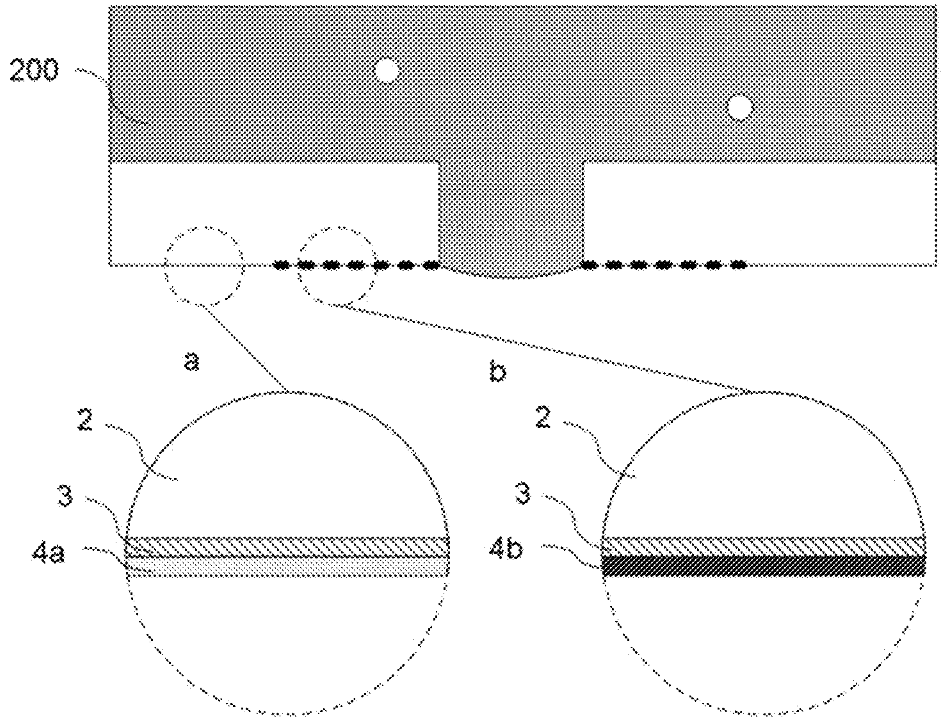
FIG. 3B is a schematic view illustrating another example of a structure around a nozzle of a liquid droplet discharging apparatus (part 2)

FIG. 3A and FIG. 3B are schematic views illustrating another example of the structure around a nozzle of the liquid droplet discharging apparatus. In FIG. 3A and FIG. 3B, "a" and "b" exemplarily illustrate the portions enclosed within broken lines in an expanded size. "a" is an expanded view of the any other region and "b" is an expanded view of the adjoining region of the nozzle.

In the embodiment of FIG. 2, a concave is formed around the nozzle. However, it is not indispensable to form a concave, but it is only needed that the adjoining region of the nozzle and the any other region have a contact angle difference as in the embodiment of FIG. 3A and FIG. 3B. The contact angles may be varied by an asperity structure of the surface (FIG. 3A), or may be varied by the difference between water repellent films on the surface (FIG. 3B).

In the embodiment of FIG. 3A, a same water repellent film is formed all over the nozzle surface. However, because of the effect of the asperity formed in the adjoining region of the nozzle (i.e., because of the relatively greater surface roughness), the water contact angle of the adjoining region of the nozzle is greater than the water contact angle of the any other region. $SiO_2$ (denoted by the reference numeral 3) for improving adhesiveness of a fluorine-based water repellent film is disposed between Si (denoted by the reference numeral 2), which is the main component of the nozzle plate, and the water repellent film 4.

In the embodiment of FIG. 3B, a water repellent film 4*b* formed on the adjoining region of the nozzle and a water repellent film 4*a* formed on the any other region have different water contact angles from each other. The water contact angle of the water repellent film 4*b* on the adjoining region of the nozzle is greater than the water contact angle of the water repellent film 4*a* of the any other region. $SiO_2$ (denoted by the reference numeral 3) for improving adhesiveness of a fluorine-based water repellent film is disposed between Si (denoted by the reference numeral 2), which is the main component of the nozzle plate, and the water repellent film (denoted by the reference numeral 4*a* or 4*b*).

The configurations of the embodiments of FIG. 3A and FIG. 3B can both be produced using a MEMS process.

Figure 4A:
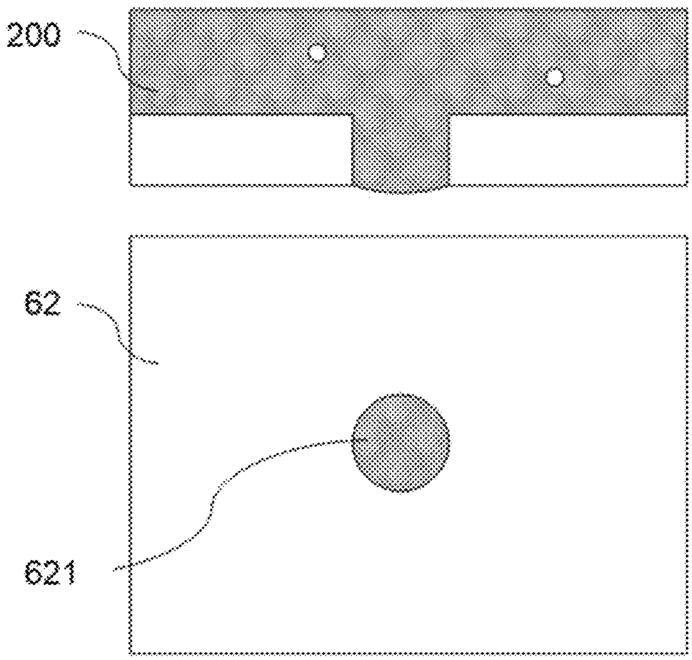
FIG. 4A is a schematic view illustrating a structural pattern around a nozzle of an existing liquid droplet discharging apparatus.
Figure 4B:
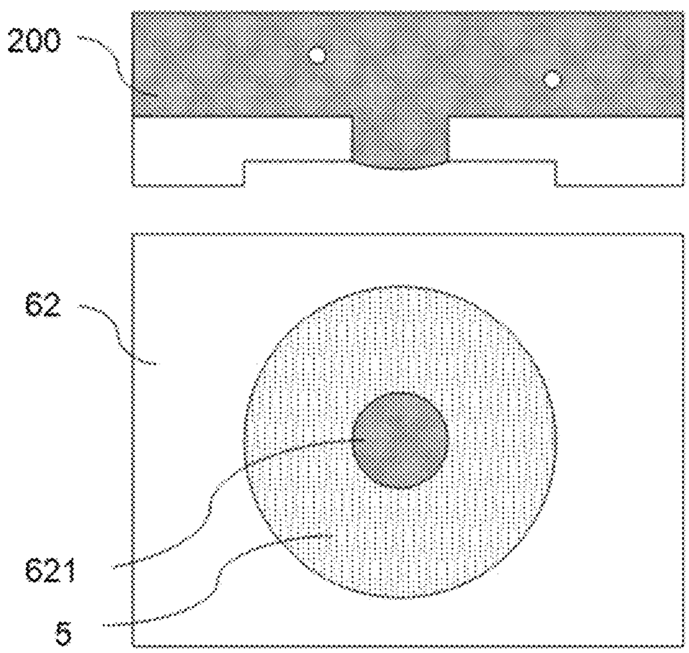
FIG. 4B is a schematic view illustrating a structural pattern around a nozzle of a liquid droplet discharging apparatus according to an embodiment 1.
Figure 4C:
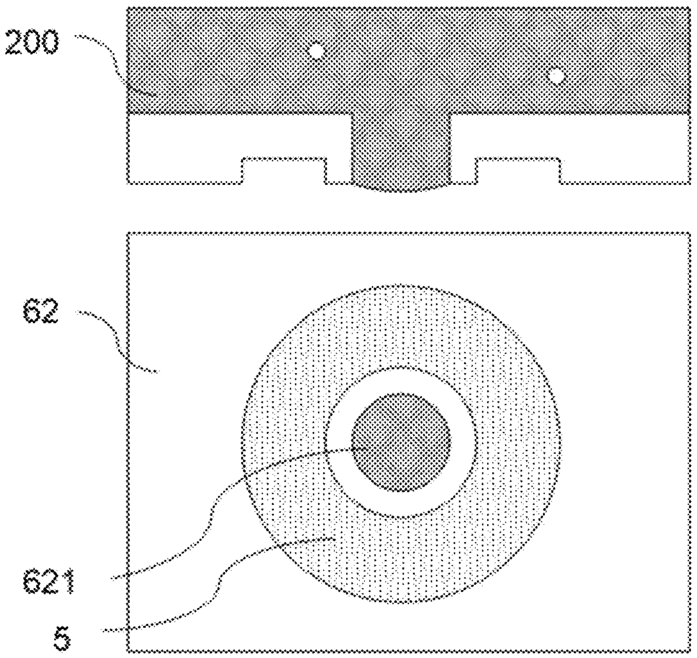
FIG. 4C is a schematic view illustrating a structural pattern around a nozzle of a liquid droplet discharging apparatus according to an embodiment 2.

FIG. 4A to FIG. 4C illustrate structural patterns around the nozzle of the liquid droplet discharging apparatus illustrated in FIG. 2. In each drawing, the upper view illustrates a cross-sectional view taken at a position transversing the nozzle in the Y axis direction like FIG. 2, and the lower view illustrates a plan view of the nozzle and the nozzle surface seen from a side to which a liquid droplet is discharged.

FIG. 4A illustrates a structure of an existing typical nozzle shape without a concave and an adjoining region around the nozzle hole. FIG. 4B illustrates the structure illustrated in FIG. 2, where the concave is present in a manner to surround the nozzle and contact the edge of the nozzle. In FIG. 4C, the concave is present in a manner to surround the nozzle and be slightly apart from the edge of the nozzle. The bottom surface (denoted by the reference numeral 5) of the concave is an adjoining region having a relatively great surface roughness. It is preferable that the concave have a concave shape concentric with the nozzle hole as in FIG. 4B and FIG. 4C, but the concave needs not necessarily have a circular shape in order to achieve the effect. The size of the concave, expressed by the distance between the inner rim and the outer rim of the concave, is preferably at least greater than or equal to half the diameter of the nozzle hole but less than or equal to five times greater than the diameter of the nozzle hole. When the size of the concave is extremely small, there is a risk that stable discharging may not be achieved because any liquid overflowing to the nozzle surface cannot keep a distance enough not to influence the next discharging. When the size of the concave is extremely large, there is a risk that any liquid overflowing to the nozzle surface may remain also in the concave, and the remaining liquid may influence discharging of the next liquid droplet.

Figure 5A:
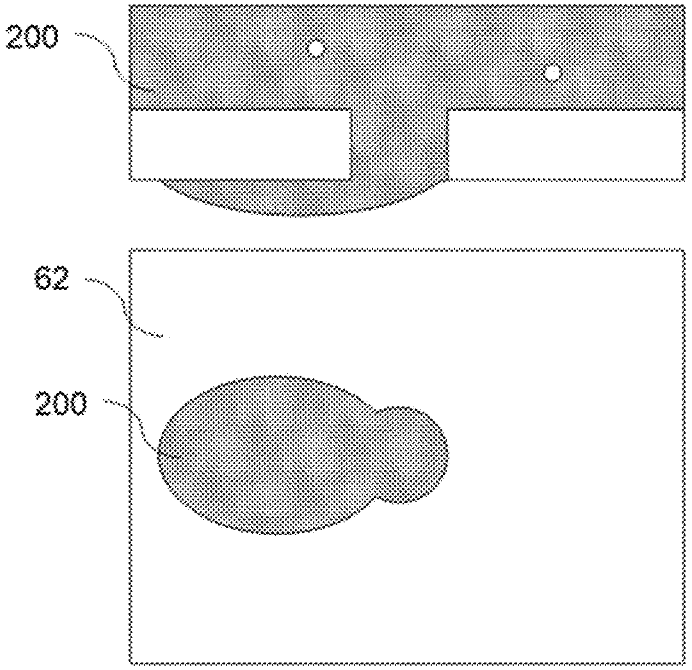
FIG. 5A is a schematic view illustrating a phenomenon when a liquid adheres to a nozzle surface in the structural pattern of FIG. 4A (existing art)
Figure 5B:
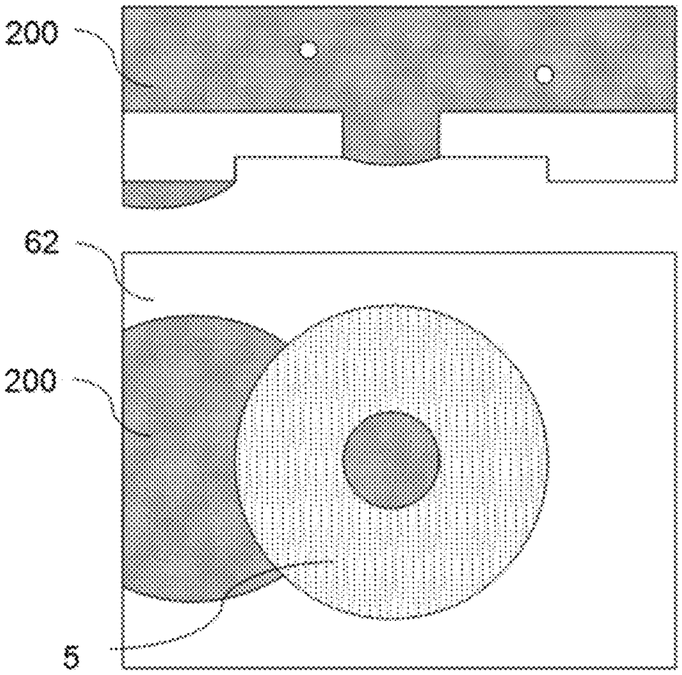
FIG. 5B is a schematic view illustrating a phenomenon when a liquid adheres to a nozzle surface in the structural pattern of FIG. 4B (embodiment 1)
Figure 5C:
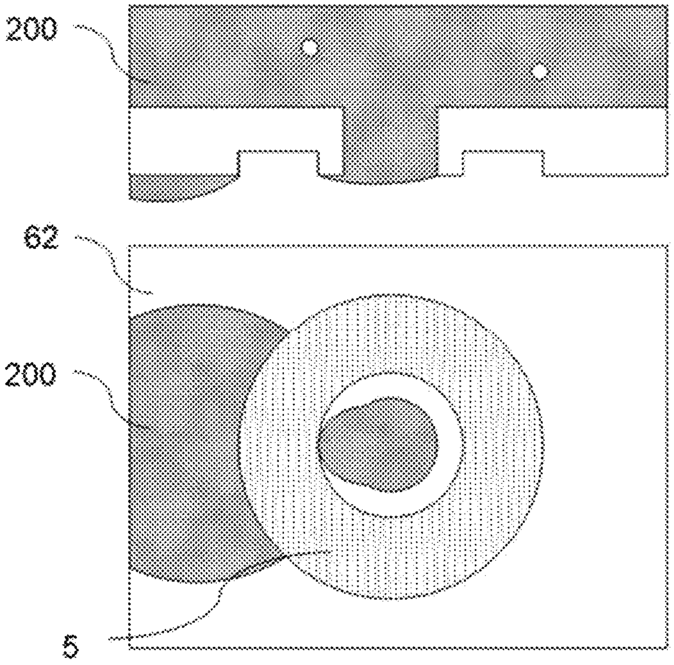
FIG. 5C is a schematic view illustrating a phenomenon when a liquid adheres to a nozzle surface in the structural pattern of FIG. 4C (embodiment 2)

FIG. 5A to FIG. 5C are schematic views illustrating phenomena when a liquid adheres to the nozzle surface in the structural patterns of FIG. 4A to FIG. 4C respectively.

FIG. 5A illustrates a phenomenon when a liquid 200 overflows to the nozzle surface in an existing typical nozzle hole shape. Any ink overflowing from the nozzle hole during discharging or maintenance couples to the ink in the nozzle hole, and forms a liquid pool coupled to the liquid in the liquid chamber as illustrated. If the next liquid droplet is discharged in this state, the flying direction of the liquid droplet is largely bent, or the liquid droplet is absorbed into the liquid pool and cannot fly.

In FIG. 5B according to the structural pattern of FIG. 4B (embodiment 1), any liquid that may overflow to the nozzle surface is kept on the nozzle surface having a relatively small water contact angle, and no ink remains near the nozzle hole. In this state, the next liquid droplet can fly correctly.

Also in FIG. 5C according to the structural pattern of FIG. 4C (embodiment 2), the same effect as the embodiment 1 works even when a nonconcaved region is present around the nozzle hole. Any liquid may slightly remain at the nonconcaved region, but is not so influential as to make discharging unstable.

Figure 5D:
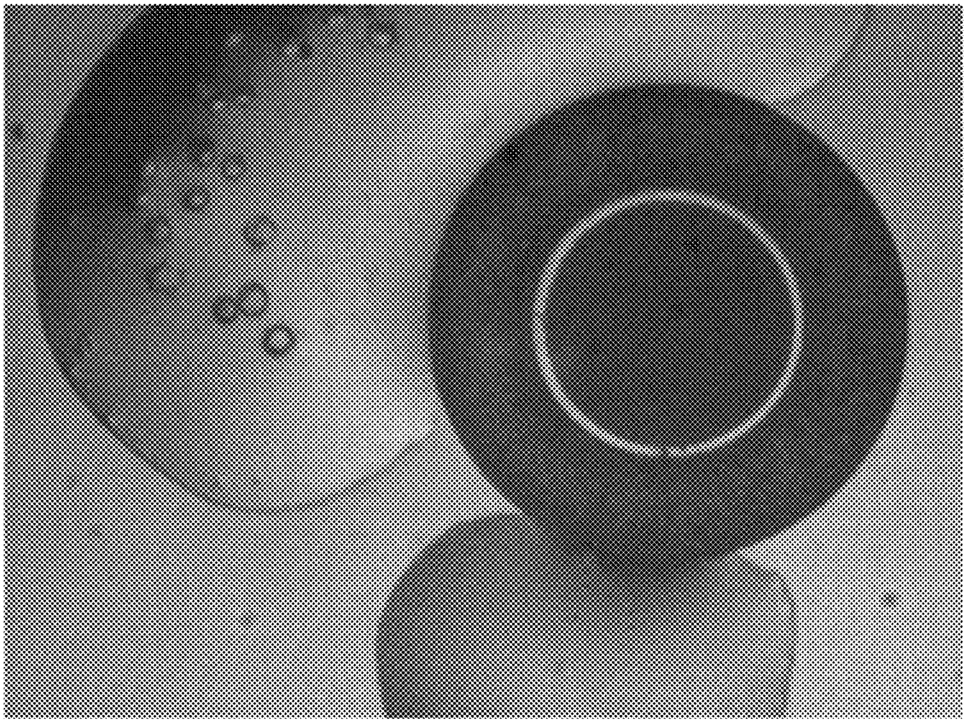
FIG. 5D is a microscopic image captured when a liquid adheres to a nozzle surface in the structural pattern of FIG. 4C.

FIG. 5D is an image captured with an optical microscope (available from Keyence Corporation, VHK-7000) when a liquid adheres to the nozzle surface in the structural pattern of FIG. 4C, and illustrates a state where the liquid that has actually overflowed to the nozzle surface is kept remaining outside and around the concave (or in the any other region). Through creating this state, liquid droplet discharging stability improves, or a normal discharging can continue long without a maintenance operation such as wiping that is commonly done.

The present disclosure is based on the present inventors' finding described above, and the solution to the problem is as follows.

<1> A liquid droplet discharging apparatus, including a liquid droplet discharging unit, wherein the liquid droplet discharging unit includes a nozzle surface, and a nozzle being formed in the nozzle surface, the liquid droplet discharging unit being configured to discharge a liquid through the nozzle, wherein a water contact angle of an adjoining region of the nozzle in the nozzle surface is greater than a water contact angle of any other region of the nozzle surface.

<2> The liquid droplet discharging apparatus according to <1>, wherein surface roughness of the adjoining region of the nozzle is greater than surface roughness of the any other region.

<3> The liquid droplet discharging apparatus according to <1> or <2>, wherein the nozzle surface has a concave around the nozzle, and the adjoining region of the nozzle is present in the concave.

<4> The liquid droplet discharging apparatus according to <3>, wherein the concave adjoins the nozzle.

<5> The liquid droplet discharging apparatus according to any one of <1> to <4>, wherein a water contact angle of an inner region within the adjoining region of the nozzle when seen in a radial direction about the nozzle is greater than a water contact angle of an outer region within the adjoining region.

<6> The liquid droplet discharging apparatus according to any one of <1> to <5>, wherein the nozzle surface includes a water repellent film.

<7> The liquid droplet discharging apparatus according to any one of <1> to <6>, wherein a nozzle plate having the nozzle surface contains silicon in an amount of 50% by mass or greater.

<8> The liquid droplet discharging apparatus according to any one of <1> to <7>, wherein the liquid contains settleable particles.

<9> The liquid droplet discharging apparatus according to <8>, wherein the settleable particles are one or more kinds selected from the group consisting of metal particles, inorganic particles, and cells.

The liquid droplet discharging apparatus according to any one of <1> to <9> can solve the various problems in the related art and achieve the object of the present disclosure.

What is claimed is:

1. A liquid droplet discharging apparatus, comprising:

a liquid droplet discharger, wherein the liquid droplet discharger includes a nozzle plate having a nozzle surface at a side of the nozzle plate from which a liquid is discharged, and a nozzle having an edge and a nozzle hole being formed in the nozzle surface, the liquid droplet discharger being configured to discharge the liquid through the nozzle, wherein a water contact angle of an adjoining region of the nozzle in the nozzle surface is greater than a water contact angle of any other region of the nozzle surface, the adjoining region has an inner rim and an outer rim and is a region apart from the edge of the nozzle at a distance of 20 μm or less from the edge of the nozzle, a length between the inner rim and the outer rim of the adjoining region is greater than or equal to half a diameter of the nozzle hole but less than or equal to five times the diameter of the nozzle hole, the nozzle surface has a concave around the nozzle, the adjoining region of the nozzle is present in the concave, surface roughness of the adjoining region of the nozzle is greater than surface roughness of the any other region, and a same water repellent film is formed over all the nozzle surface.

2. The liquid droplet discharging apparatus according to claim 1, wherein the concave adjoins the nozzle.

3. The liquid droplet discharging apparatus according to claim 1, wherein a water contact angle of an inner region within the adjoining region of the nozzle when seen in a radial direction about the nozzle is greater than a water contact angle of an outer region within the adjoining region.

4. The liquid droplet discharging apparatus according to claim 1, wherein the nozzle plate having the nozzle surface contains silicon in an amount of 50% by mass or greater.

* * * * *